United States Patent
Kawakami (10) Patent No.: US 8,585,027 B2
(45) Date of Patent: Nov. 19, 2013

(54) CLAMP DEVICE

(75) Inventor: Takayuki Kawakami, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 314 days.

(21) Appl. No.: 12/737,628

(22) PCT Filed: Jun. 9, 2009

(86) PCT No.: PCT/JP2009/002594
§ 371 (c)(1),
(2), (4) Date: Jan. 31, 2011

(87) PCT Pub. No.: WO2010/016181
PCT Pub. Date: Feb. 11, 2010

(65) Prior Publication Data
US 2011/0133381 A1    Jun. 9, 2011

(30) Foreign Application Priority Data

Aug. 6, 2008  (JP) .................. 2008-203569

(51) Int. Cl.
*B23Q 3/00* (2006.01)
*B23Q 3/08* (2006.01)
(52) U.S. Cl.
USPC .............................. 269/25; 269/310; 269/309
(58) Field of Classification Search
USPC ......... 269/20, 24, 25, 27, 28, 32, 228, 289 R, 269/309–310
See application file for complete search history.

(56) References Cited

U.S. PATENT DOCUMENTS

| 6,095,509 | A | * | 8/2000 | Yonezawa | ..................... 269/309 |
| 6,988,720 | B2 | | 1/2006 | Kawakami | |
| 2010/0320664 | A1 | | 12/2010 | Kawakami | |
| 2010/0327503 | A1 | | 12/2010 | Kawakami | |

FOREIGN PATENT DOCUMENTS

| DE | 4020981 | 1/1992 |
| JP | 11-188551 | 7/1999 |
| JP | 2003-266262 | 9/2003 |
| JP | 2004-195583 | 7/2004 |
| JP | 3550010 | 8/2004 |
| JP | 4297511 | 7/2009 |
| JP | 4302174 | 7/2009 |
| JP | 2009-190137 | 8/2009 |
| JP | 2009-214288 | 9/2009 |

* cited by examiner

*Primary Examiner* — Monica Carter
*Assistant Examiner* — Nirvana Deonauth
(74) *Attorney, Agent, or Firm* — Jordan and Hamburg LLP (57) ABSTRACT

A clamp device has a grip member for gripping the inner peripheral surface of a hole in a workpiece, a clamp rod having a tapered shaft portion that is fitted into and engaged with the grip member, a hydraulic cylinder for driving the grip member and the clamp rod forwards and backwards in the axial direction, and a main body member to which the above elements are mounted. A tubular cylindrical main body portion projecting upwards is provided at the center portion of an upper half portion of the main body member. The outer diameter of this tubular main body portion is set less than or equal to three times the outer diameter of the grip member in the unclamped state, and, in the unclamped state, the upper half portions of the grip member and the tapered shaft portion are made to project outward from the upper end of the tubular main body portion.

19 Claims, 10 Drawing Sheets

CLAMP DEVICE

TECHNICAL FIELD

The present invention relates to a clamp device that grips and fixes to an aperture in a workpiece, and, more particularly, relates to such a clamp device in which a small diameter tubular main body portion is provided in the center portion of an upper half portion of a main body member, and in which a grip member and a clamp rod are installed to the tubular main body portion, whereby clamping can be performed without experiencing any influence from convex or concave portions or stepped portions near the workpiece aperture.

BACKGROUND TECHNOLOGY

When performing machine processing of the upper surface of a workpiece, a clamp device of the type described above (i.e. so called hole clamp) is employed, since it is not possible to employ a clamp device of the type in which pressing force is exerted by a pressing member on an end portion of the workpiece from above. With such a clamp device, a seating surface on which the workpiece as an object of clamping is seated is formed on a main body member, and, when loading the workpiece, the workpiece is mounted on the seating surface and is supported thereby, and then the workpiece is fixed on the seating surface by inserting, into an aperture in the workpiece, a grip member and a tapered shaft portion of a clamp rod inserted through the grip member, by dilating grip claws with the tapered shaft portion so that they engage (i.e. grip) the inner circumferential surface of the aperture, and by then again pulling this grip member towards the seating surface. Clamp devices of this type are described in Patent Documents #1 and #2.

With the clamp devices described in these Patent Documents #1 and #2, the grip member and the tapered shaft portion are built so as to project for a predetermined short distance from the central portion of the main body member of the clamp device, and the diameter of the main body member is four times or more the diameter of the grip member.
Patent Document #1: Japanese Patent No. 3,550,010.
Patent Document #2: German Patent. No. 4,020,981.

DISCLOSURE OF THE INVENTION

Problems to be Solved by the Invention

The great variety of workpieces that are to be clamped with such hole clamps include many workpieces, such as the lid member of a case body and so on, in which it is arranged to couple a flange portion to a matching flange portion of a case body by bolts: a plurality of protruding ribs are formed on the outside of the flange portion of such a workpiece, and shallow seating portions are formed in portions adjacent to a plurality of bolt holes. During the cutting process of this workpiece, the outer portion of the workpiece is clamped downwards, and cutting is performed on the surface of the flange portion.

Regarding a prior hole clamp, a construction is employed in which a grip member and a tapered shaft portion are provided so as to project outwards by a predetermined short distance from the central portion of a main body member, and the main body member is of a thick structure and has an outer diameter that is four times or more the diameter of the grip member. Accordingly, when clamping a workpiece, sometimes it is not possible to perform clamping because it is not possible to insert the grip member and the tapered shaft portion of the clamp rod into the bolt hole in the workpiece, since the flange portion of the workpiece gets in the way. Furthermore sometimes it has also become impossible to perform clamping normally because, when the surface of the seating portion of the bolt hole in the workpiece is supported with the main body member, it is not possible sufficiently to insert the grip member and the tapered shaft portion into the bolt hole in the workpiece.

In summary, with prior hole clamps, there are many cases in which it is not possible to perform clamping of a workpiece when a convex portion is present in the vicinity of the aperture of the workpiece as the object of clamping, when a concave portion is present in the vicinity of the aperture, when a stepped portion is present in the vicinity of the aperture, or the like.

Thus, it is preferable to provide a structure in which the upper half portion of the main body member of the clamp device is formed to be thin, and in which the grip member and the tapered shaft portion are projected outwards from the upper end of the small diameter portion. However, a support member for supporting the grip member is required around the outer peripheries of the grip member and the clamp rod, and it is difficult to reduce the diameter of this support member.

Moreover it is necessary to detect the upper limit position of the support member in order to confirm the unclamped state, and it is also necessary to detect the lower limit position of the clamp rod in order to detect slippage of the grip member relative to the workpiece; but it is difficult to detect the lower limit position of the clamp rod, because it is arranged for the clamp rod so as to move upwards and downwards independently from the support member; and furthermore it is necessary to provide a stopper to the main body member in order to stop the clamp rod at its lower limit position.

The object of the present invention is to provide a hole clamp that is capable of performing clamping without being impeded by a convex portion, a concave portion, or a stepped portion in the vicinity of the aperture as the object of clamping, to provide a hole clamp that is capable of detecting both the upper limit position of a support member and the lower limit position of a clamp rod with a common detection means.

Means for Solving the Problems

The present invention presents a clamp device comprising an annular grip member capable of being inserted into an aperture in a workpiece and gripping an inner peripheral surface of the aperture, a clamp rod having a tapered shaft portion fitted into and engaged with the grip member, a fluid pressure cylinder capable of driving the grip member and the clamp rod forwards and backwards in an axial direction, and a main body member to which the grip member, the clamp rod, and the fluid pressure cylinder are mounted, characterized in that: a tubular main body portion projecting upwards and having an outer diameter three times or less than an outer diameter of the grip member in an unclamped state is provided at a center portion of an upper half portion of the main body member; and, in the unclamped state, an upper half portion of the grip member and the tapered shaft portions of the clamp rod project outwards from an upper end of the tubular main body portion.

If there are some convex portions, a concave portion, or a stepped portion in the neighborhood of the aperture that is to be the object for clamping, then it is possible to clamp to the aperture with the grip member and the tapered shaft portion of the clamp rod, by inserting the tubular main body portion between the convex portions or by inserting it into the concave portion.

Advantageous Effects of the Invention

According to the clamp device of the present invention, since the tubular main body portion is provided at the center portion of the upper half portion of the main body member so as to project upwards and is formed to have an outer diameter that is three times or less the outer diameter of the grip member in its unclamped state, and since it is arranged for the upper half portion of the grip member and the tapered shaft portion of the clamp rod to project outwards from the upper end of the tubular main body portion in the unclamped state, accordingly the following technical advantages can be obtained.

Even if there are some convex portions, a concave portion, or a stepped portion in the neighborhood of the aperture that is to be the object of clamping, it is still possible to clamp the aperture with the grip member and the tapered shaft portion of the clamp rod by inserting the tubular main body portion between the convex portions, or by inserting it into the concave portion. Accordingly it is possible to improve the usability of the clamp device, and to enhance the flexibility of the clamp device remarkably.

It should be understood that there is also no obstacle when clamping a workpiece in which there is no convex portion, concave portion, or stepped portion in the neighborhood of the aperture.

In addition to the structure of the present invention as described above, it would also be acceptable to provide various supplementary structures, as follows.

(1) There may be further included: a seating surface for seating a workpiece, formed at an upper end portion of the tubular main body portion; a piston portion and a rod portion extending from the piston portion upwards into the tubular main body portion, the piston portion and the rod portion being constituted with a piston member of the fluid pressure cylinder; an annular pressure reception member fitted over the rod portion and is biased upwards by fluid pressure; and a support member that is movably fitted on an exterior of the rod portion and capable of moving integrally with the annular pressure reception member, and supports the grip member from beneath. According to this structure, in the state in which the workpiece is supported on the seating surface, the grip member and the tapered shaft portion are inserted into the aperture, and the grip member is supported by the annular pressure reception member and the support member that are biased upwards by fluid pressure, it is possible, after having driven the clamp rod downwards so that the grip member bites into the wall surface of the aperture, to clamp the workpiece by driving the clamp rod downwards.

(2) There may be further included: a T-shaped engagement portion formed at a lower end portion of the clamp rod; and a T-shaped concave engagement portion formed at an upper end portion of the rod portion, to which the T-shaped engagement portion can engage from a horizontal direction. According to this structure, it becomes possible to reduce the diameter of the rod portion of the piston member of the fluid pressure cylinder, and to reduce the diameter of the tubular main body portion.

(3) An upper end portion and an outer circumferential portion of an upper half portion of the rod portion may be formed as a separated outer circumferential member that constitutes the T-shaped concave engagement portion; a threaded shaft portion may be formed on an upper half portion of the rod portion; and the separated outer circumferential member may be screwed to the threaded shaft portion. According to this structure, advantages are obtained from the point of view of manufacturing the T-shaped concave engagement portion, and from the point of view of engagement to the T-shaped concave engagement portion of the T-shaped engagement portion of the clamp rod.

(4) A fluid operation chamber for clamping that applies fluid pressure on the annular pressure reception member to operate in an upwards direction may be formed between the piston portion of the fluid pressure cylinder and the annular pressure reception member. According to this structure, the annular pressure reception member is always biased upwards by the fluid pressure in the fluid operation chamber for clamping, and it is possible to support the grip member with the support member.

(5) A engagement flange portion formed at an upper end portion of the annular pressure reception member may be contained in a containment bore of the main body member slidably upwards and downwards; a lower limit position of the annular pressure reception member may be regulated by receiving the engagement flange portion with a lower end wall of the containment bore; and an upper limit position of the annular pressure reception member may be regulated by receiving the engagement flange portion with an upper end wall of the containment bore. According to this structure, it is possible to regulate the upper limit position and the lower limit position of the annular pressure reception member.

(6) It may be arranged for a lower limit position of the clamp rod to be regulated by a lower end portion of the separated outer circumferential member being stopped by the annular pressure reception member which is at its lower limit position. According to this structure, there is no requirement to provide any stopper member to the main body member, because the lower limit position of the clamp rod is regulated by the lower end of the separated outer circumferential member being received and stopped by the annular pressure reception member which is at its lower limit position.

(7) The support member may be made separate from the annular pressure reception member, and a lower end of the support member may be contacted against an upper end of the annular pressure reception member. According to this structure, it becomes possible to provide the structure described in above (6), because the support member is built so as to be separate from the annular pressure reception member.

(8) The grip member and the clamp rod may be formed to be movable along a direction orthogonal to the axis. According to this structure, even if there is some manufacturing error in the size or the position of the aperture in the workpiece, it is still possible for the grip member to bite into and engage with the wall surface of the aperture.

(9) An elastic biasing means may be provided that elastically biases the grip member and the clamp rod so that an axis of the grip member and the clamp rod coincides with an axis of the fluid pressure cylinder. According to this structure, in the unclamped state, the axis of the grip member and the clamp rod is returned by the elastic biasing means so as to coincide with the axis of the fluid pressure cylinder.

(10) An operation confirmation means may be provided, having an air ejection hole that opens in a lower end wall of the containment bore so as to face the engagement flange portion, an air passage for supplying pressurized air to the air ejection hole, and an air pressure detection means for detecting the presence or absence of air pressure within the air passage; and it may be arranged so as to detect, with the operation confirmation means, the states in which the annular pressure reception member is at its upper limit position and the state in which it is at its lower limit position. Since, according to this structure, the states in which the annular pressure reception member is at its upper limit position and at its lower limit position can be detected by the operation confirmation means, accordingly it is possible to confirm the unclamped state in which the grip member and the annular pressure reception member are at their upper limit positions, and it is also possible to confirm the state in which, during clamping, the grip member and the annular pressure reception member have reached their lower limit positions without the grip member gripping the wall surface of the aperture in the workpiece.

DESCRIPTION OF NUMERALS

C, CA, CB: clamp device
1: main body member
2: grip member
3, 3A, 3B: clamp rod
4: hydraulic pressure cylinder
5, 5A, 5B: annular pressure reception member
6: support member
11: upper main body member
11a, 11aA, 11aB: tubular main body portions
12: lower main body member
14: containment bore
14a: upper end wall
14b: lower end wall
18: seating surface
28: scraper (elastic biasing means)
33: T-shaped engagement portion
41, 41A, 41B: piston member
42: hydraulic chamber for clamping
43: hydraulic chamber for unclamping
45: piston portion
46, 46A, 46B: rod portion
47, 47A: T-shaped concave engagement portion
48: separated outer circumferential member
49: threaded shaft portion
52: engagement flange portion
80: operation confirmation mechanism
81: air ejection hole
82~85: air passage
86: pressure switch Best Mode for Implementing the Invention In the following, preferred modes for implementing the present invention will be explained on the basis of embodiments.

Embodiment 1

As shown in FIGS. 1 to 4, a clamp device C includes a main body member 1, a grip member 2 that is a clamp member for fixing a workpiece W, a clamp rod 3, a hydraulic pressure cylinder 4 that is capable of driving the grip member 2 and the clamp rod 3 in their axial direction (i.e. vertical direction), and an annular pressure reception member 5 and a support member 6 included in the hydraulic pressure cylinder 4. The main body member 1 includes an upper main body member 11 and a lower main body member 12, and this clamp device C is used in a state mounted on a base main body member 13.

Figure 1:
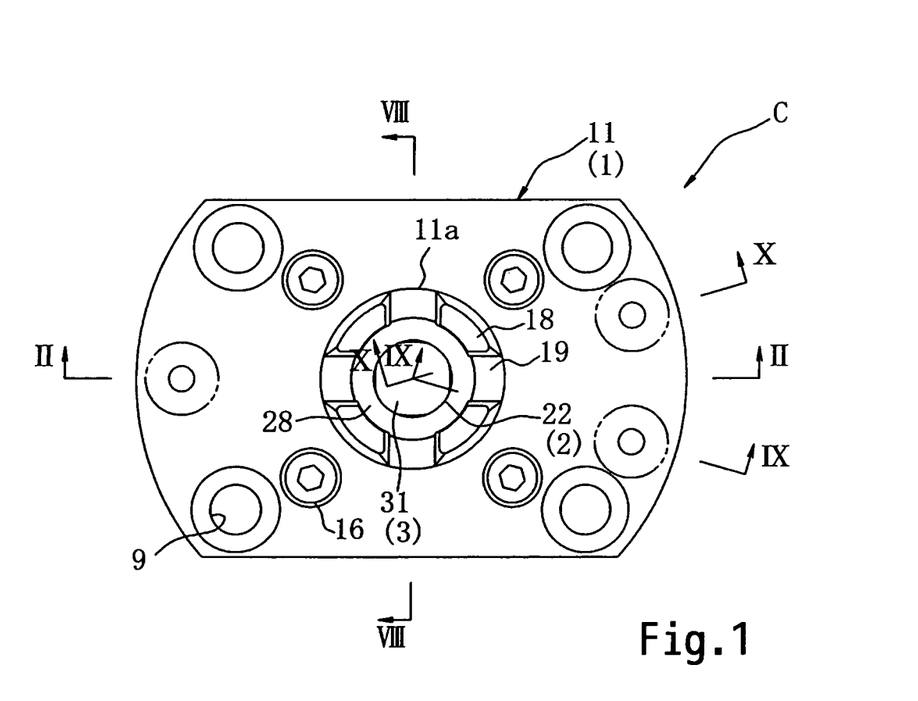
FIG. 1 is a plan view of a clamp device according to an embodiment of the present invention.

As seen in plan view, the upper main body member 11 is almost shaped as an ellipse, and this upper main body member 11 is fixed to the base main body member 13 with four bolts that are inserted into four bolt holes 9. The lower main body member 12 is an annular member in which a cylindrical bore 44 is formed, and the upper end portion of the lower main body member 12 is fitted into a concave portion 15 on the lower side of the upper body member portion 11, and is fixed to the upper main body member 11 by four bolts 16.

There is provided a tubular main body portion projecting upwards at the center portion of the upper half portion of the main body member 1, This tubular main body portion 11a has an outer diameter three times or less than the outer diameter of the grip member 2 in the unclamped state. It is arranged for the upper half portion of the grip member 2 and a tapered shaft portion 31 of the clamp rod 3 to project out from the upper end of the tubular main body portion 11a, in the unclamped state.

Here, it is preferable for the outer diameter of the tubular main body portion 11a to be set within a range of 1.8 to 3.0 times the outer diameter of the grip member 2 in the unclamped state, and the outer diameter of the tubular main body portion 11a of this embodiment is set to 2.6 times the outer diameter of the grip member 2 in the unclamped state.

As shown in FIGS. 1 to 4, the grip member 2 is inserted vertically through a aperture 17 in the center portion of the upper end portion of the tubular main body portion 11a. Four seating surfaces 18 shaped as circular arcs are formed on the upper surface of the tubular main body portion 11a and surround the grip member 2, and, in the state in which the workpiece W is seated on these seating surfaces 18, the workpiece W can be clamped. Four concave grooves 19 through which currents of pressurized air flow are formed in the shape of a "+" sign on the upper surface of the tubular main body portion 11a.

The grip member 2 is capable of being inserted into an aperture H in the workpiece W and gripping the inner peripheral surface of the aperture H. This grip member 2 includes a rod through hole 21, a grip claw portion 22, and a base end flange portion 23. The grip member 2 is divided into four equal parts by four slits (not shown in the figures), and these four separated parts define a ring shape.

Teeth 22a having three steps are formed on the outer peripheral surface of the grip claw portion 22 of the metallic grip member 2, and these allow it to grip the inner peripheral surface of the aperture H of the workpiece W easily. The clamp rod 3 is passed through the rod through hole 21 of the grip member 2. The portion of this rod through hole 21 that corresponds to the grip claw portion is formed as a tapered hole portion 21a to which the tapered shaft portion 31 of the clamp rod 3 is closely engaged.

As shown in FIGS. 1 to 4, a scraper 28 (i.e. an elastic biasing means) that is made from an elastic material (for example, rubber or synthetic resin) and that slides in contact with the outer peripheral surface of the grip member 2 is installed in the aperture 17 at the upper end of the tubular main body portion 11a. This scraper 28 is a device for obtaining a function of preventing ingress of foreign matter, and providing a function of centering so that, during the unclamped state, the axis of the grip member 2 and the clamp rod 3 coincides with the axis of the hydraulic pressure cylinder 4. Moreover, an O-ring 29 is installed on the lower portion of the grip member 2 and biases its four separated parts in the inward radial direction.

The base end flange portion 23 of the grip member 2 is received in a circular concave portion 25 of the tubular main body portion 11a, with a gap 26 being defined around the outer circumferential surface of the base end flange portion 23. The base end flange portion 23 is held between an upper wall portion of the circular concave portion 25 and a horizontal plate portion 62 of the support member 6 so as to be movable in the horizontal direction, and is supported by the support member 6. The grip member 2 is installed so that it can be raised and lowered integrally with the support member 6 and the annular pressure reception member 5, and so that it is also shiftable in horizontal directions orthogonal to the axis of the hydraulic pressure cylinder 4 by means of the annular gap 26 in the external periphery portion of the circular concave portion 25 and elastic deformation of the scraper 28. Therefore, when the workpiece W is clamped, if the axis of the aperture H as an object of clamping deviates from the axis of the clamp device C (i.e. the axis of the hydraulic pressure cylinder 4), then it is still possible to perform clamping while absorbing this deviation.

The clamp rod 3 has the tapered shaft portion 31, a small diameter rod portion 32 that continues downward from the lower end of the tapered shaft portion 31, and a T-shaped engagement portion 33 that continues downward from the lower end of this small diameter rod portion 32. The tapered shaft portion 31 and the small diameter rod portion 32 are passed through the rod through hole 21 of the grip member 2. The tapered shaft portion 31 is formed at the upper end portion of the clamp rod 3 so that its diameter increases upwards, and the tapered shaft portion 31 is movably fitted into and engaged with the tapered hole portion 21a of the grip member 2.

As shown in FIGS. 2 to 8, the hydraulic pressure cylinder 4 is for driving the grip member 2 and the clamp rod 3 forwards and backwards (upwards and downwards) along the axial direction. This hydraulic pressure cylinder 4 includes a piston member 41, a hydraulic chamber for clamping 42, a hydraulic chamber for unclamping 43, an annular pressure reception member 5, and so on. The piston member 41 has a piston portion 45 that is fitted in the vertical cylinder bore 44 so as to be movable freely upwards and downwards therein, and a rod portion 46 extending upwards from the upper end of the piston portion 45 into the interior of the tubular main body portion 11a. A seal member 45a is fitted on the piston portion 45. And, at the upper end portion of the rod portion 46, there is formed a T-shaped concave engagement portion 47 that can engage from a horizontal direction with the T-shaped engagement portion 33 of the clamp rod 3.

The upper end portion and the outer circumferential portion of the upper half portion of the rod portion 46 are formed as a separated outer circumferential member 48 that defines a T-shaped concave engagement portion 47, and a threaded shaft portion 49 is formed on the central portion of the upper half portion of the rod portion 46, with the lower half portion of the separated outer circumferential member 48 being screwed over and engaged to the threaded shaft portion 49. The outer diameter of the separated outer circumferential member 48 is formed to be slightly larger than the outer diameter of the lower portion of the rod portion 46, and, at the lower end of the separated outer circumferential member 48, there is formed an engagement stop portion 48a that is engagable with the upper end of a thin sleeve 53 of the annular pressure reception member 5 which will be described later.

Figure 2:
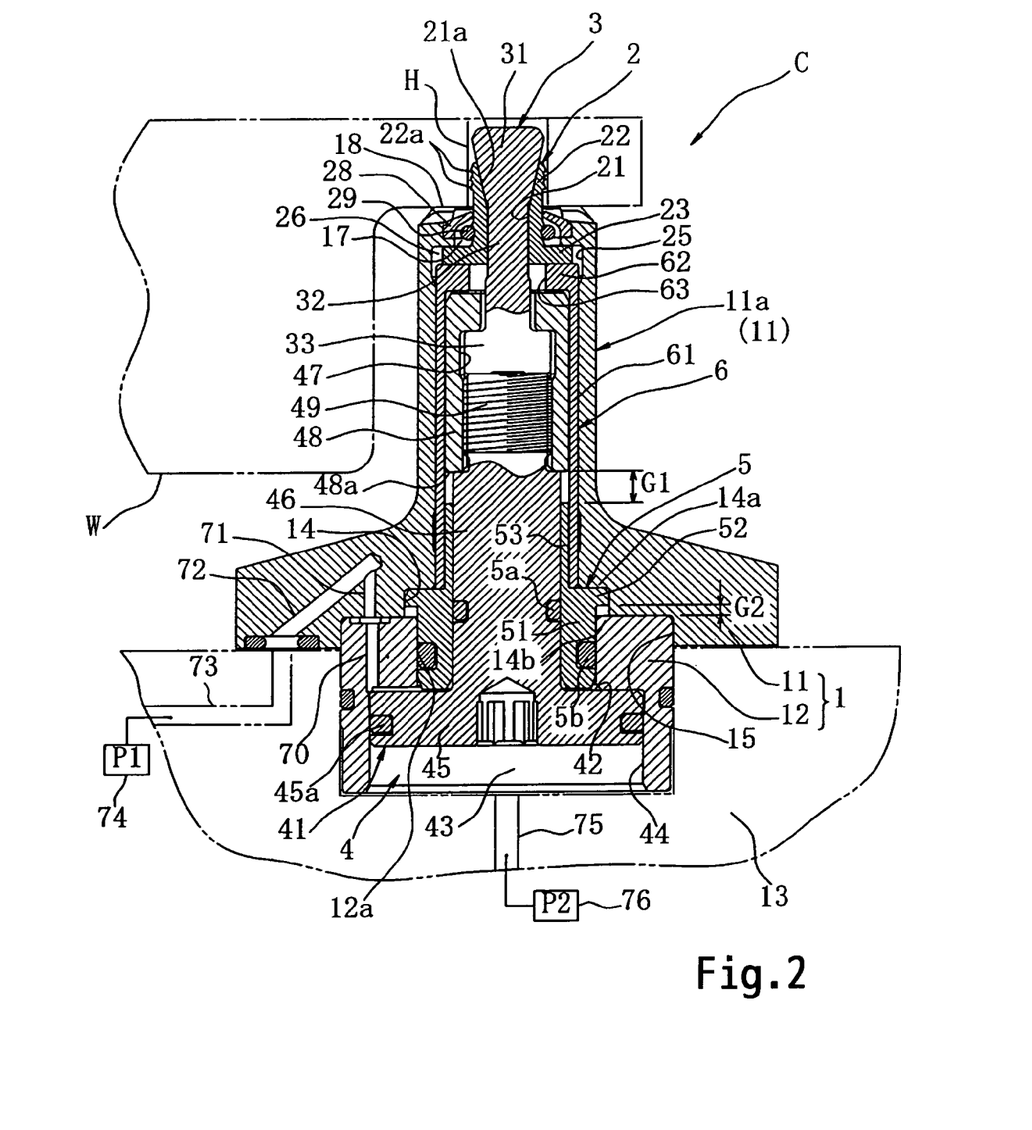
FIG. 2 is a sectional view along lines II-II of FIG. 1.
Figure 3:
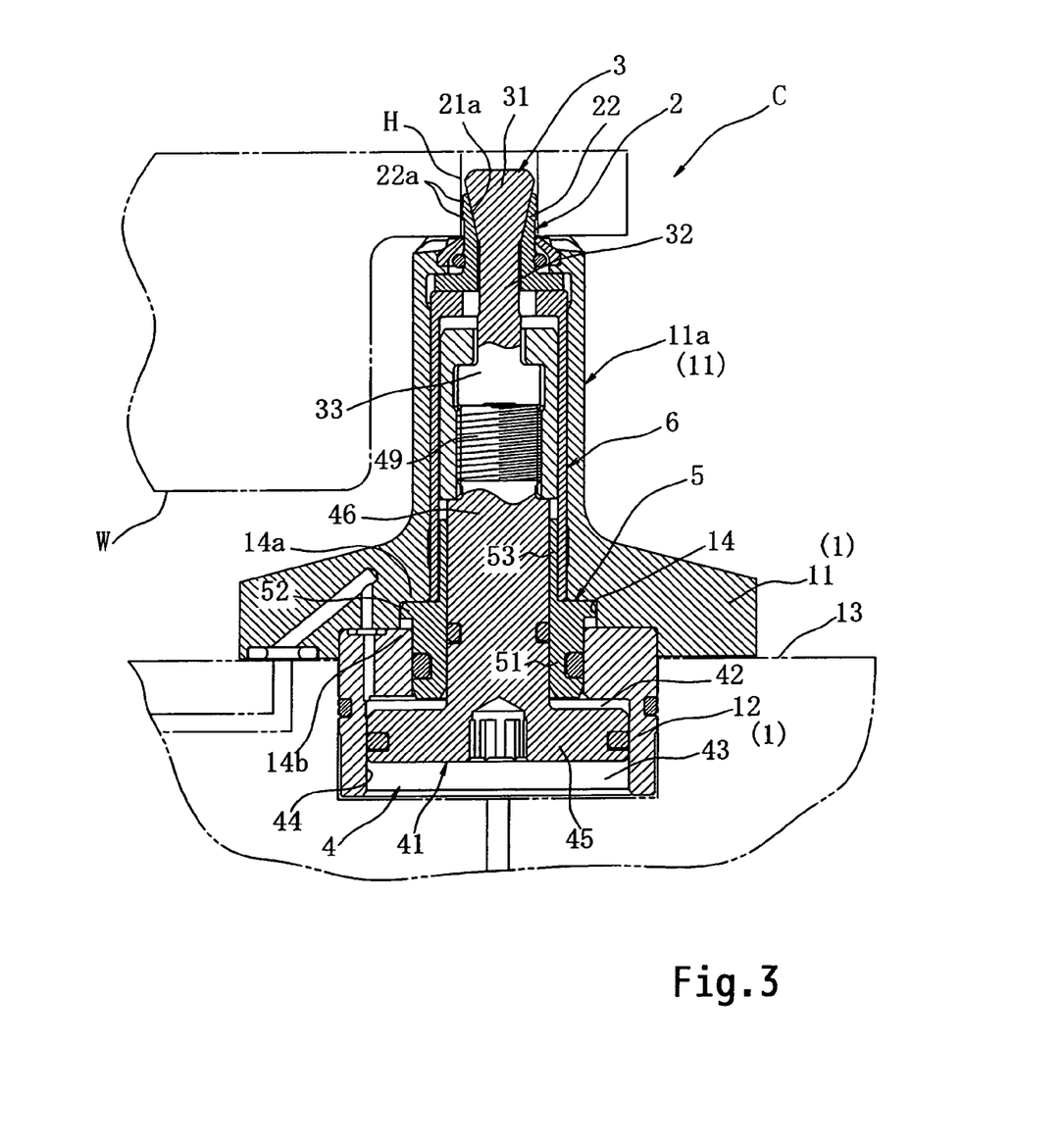
FIG. 3 is the same sectional view as FIG. 2 (gripped state)
Figure 4:
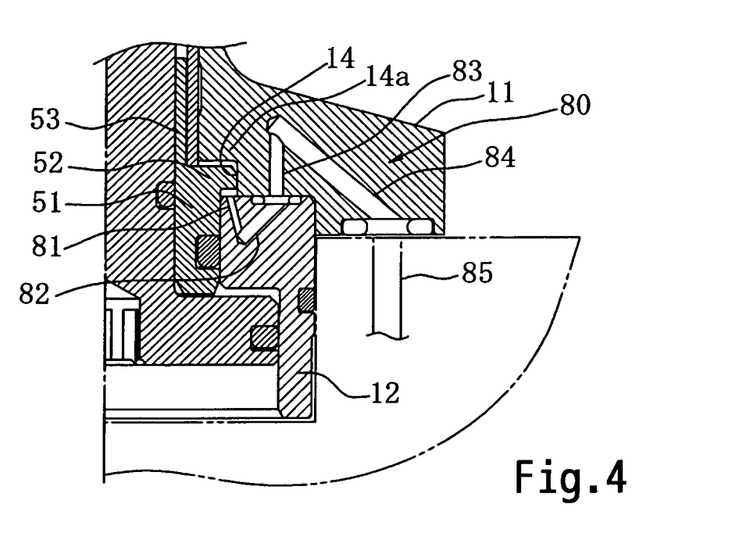
FIG. 4 is a sectional view of the essential portions of the clamp device in the clamped state.

When the T-shaped engagement portion 33 of the clamp rod 3 is to be installed into the T-shaped concave engagement portion 47, as shown in FIGS. 5 to 8 (particularly, in FIGS. 6, 7), a state is established in which the screw engagement of the separated outer circumferential member 48 over the threaded shaft portion 49 is loosened upwards by, for example, approximately 2 to 3 mm, and the T-shaped engagement portion 33 is engaged in a horizontal direction to the T-shaped concave engagement portion 47; and when thereafter the separated outer circumferential member 48 is perfectly screwed onto and engaged with the threaded shaft portion 49, the state shown in FIGS. 2 to 4 is reached. In this state, the piston member 41 and the clamp rod 3 can move upwards and downwards integrally.

Here a gap of, for example, approximately 0.5 to 1 mm is defined between the T-shaped engagement portion 33 and the separated outer circumferential member 48, so that the clamp rod 3 can be relatively shifted in a horizontal direction with respect to the T-shaped concave engagement portion 47 by just the value of the above described gap. It should be understood that the width of the opening portion 47a at the upper end of the separated outer circumferential member 48 is smaller than that of the tapered shaft portion 31 of the clamp rod 3. The clamping hydraulic chamber 42 is defined above the piston portion 45, and the unclamping hydraulic chamber 43 is defined below the piston portion 45 by the lower main body member 12 and the base main body member 13.

The annular pressure reception member 5 includes a annular piston 51, a engagement flange portion 52 at the upper end portion of the annular piston 51, and a thin sleeve 53 extending upwards from the internal peripheral portion of the engagement flange portion 52 for a predetermined distance. The annular piston 51 is fitted over the rod portion 46 so as to slide freely thereon, and is fitted into a cylinder bore 12a of the lower main body member 12 so as to slide freely therein. A seal member 5a is fitted between the annular pressure reception member 5 and the rod portion 46, and a seal member 5b is fitted on an external peripheral portion of the annular piston 51.

In the unclamped state shown in FIG. 2, a gap G1 of, for example, approximately 3 to 4 mm is defined between the upper end of the thin sleeve 53 and the engagement stop portion 48a of the separated outer circumferential member 48, and the gap G1 serves as a "grip member radial expansion stroke".

The engagement flange portion 52 of the annular pressure reception member 5 is installed in a containment bore 14 that is defined by the upper main body member 11 and the lower main body member 12, so as to be movable upwards and downwards in the vertical direction by, for example, approximately 2 mm. The lower limit position of the annular pressure reception member 5 is regulated by the engagement flange portion 52 engaging with the lower end wall 14b of the containment bore 14, while the upper limit position of the annular pressure reception member 5 is regulated by the engagement flange portion 52 engaging with the upper end wall 14a of the containment bore 14. The gap G2 of approximately 2 mm described above is the maximum "pulling down stroke" for clamping. However, during clamping, the actual pulling down stroke is, for example, 0.5 to 1.0 mm.

The support member 6 includes a thin barrel portion 61 that is fitted over the thin sleeve 53 and the rod portion 46, and a horizontal plate portion 62 at the upper end of the thin barrel portion 61. While the clamp rod 3 passes through an aperture 63 in the horizontal plate portion 62, this aperture 63 is formed of a size capable of passing the clamp rod 3. The horizontal plate portion 62 contacts against and supports the lower surface of the base end flange portion 23 of the grip member 2, and the lower end of the thin barrel portion 61 contacts against and is supported by the upper end of the annular pressure reception member 5, so that it is arranged for the support member 6 to be raised and lowered integrally with the annular pressure reception member 5.

The lower end of the annular pressure reception member 5 faces into the clamping hydraulic pressure chamber 42 and receives the hydraulic pressure therein. The clamping hydraulic chamber 42 is connected to a hydraulic pressure supply source via hydraulic passages 70 to 73, and a hydraulic pressure detection sensor 74 is also provided that detects the hydraulic pressure in the hydraulic passage 73. Moreover, the unclamping hydraulic chamber 43 is connected to a hydraulic pressure supply source via a hydraulic passage 75, and a hydraulic pressure detection sensor 76 is also provided that detects the hydraulic pressure in the hydraulic passage 75.

A seating detection means (not shown in the figures) is also provided that, in the state in which the workpiece W has been clamped as shown in FIGS. 1 to 4, detects the fact that the lower surface of the workpiece W is tightly contacted against the seating surface 18. This seating detection means includes a pressurized air ejection hole that opens to the seating surface 18, an air passage formed in the main body member 1 and the base main body member 13 so as to communicate with this pressurized air ejection hole, an air passage that connects the air passage with a pressurized air supply source, a pressure switch that detects the fact that the pressure of the pressurized air in this air passage has risen to a set value, and so on.

Figure 9:
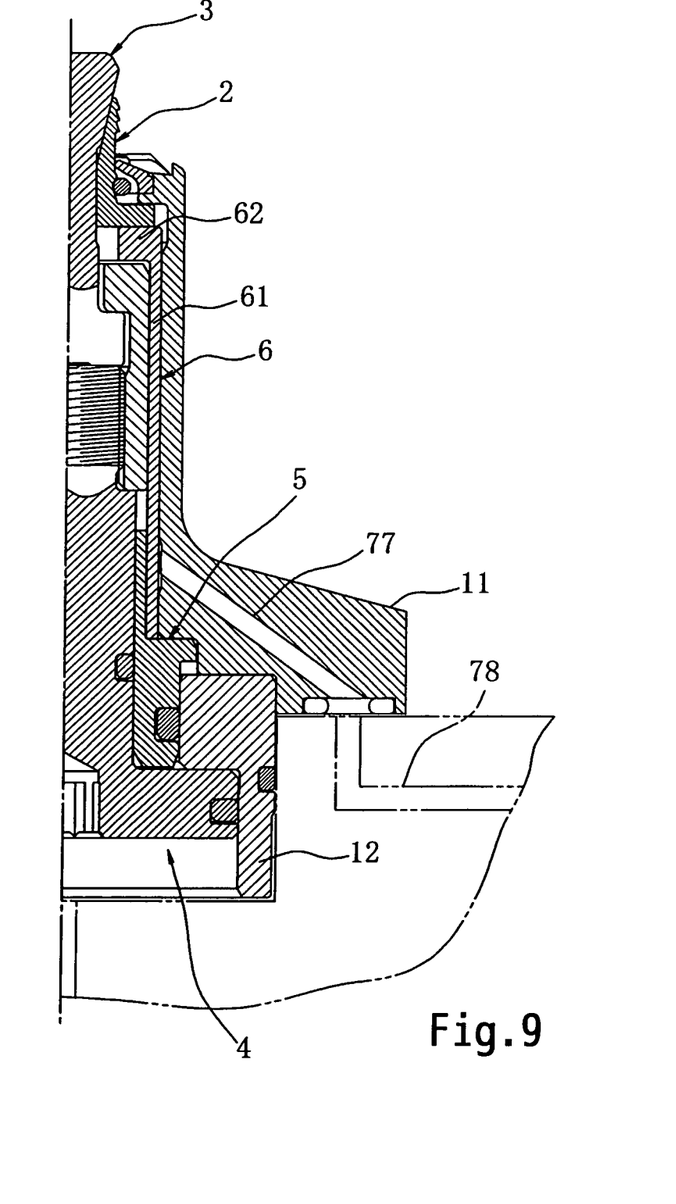
FIG. 9 is a sectional view along lines IX-IX of FIG. 1.

As shown in FIG. 9, pressurized air is supplied from an air passage 78 formed in the base main body member 13 and an air passage 77 formed in the upper main body member 11 to a gap between the tubular main body portion 11a and the support member 6, and this pressurized air flows to a gap 26 around the outer circumference of the base end flange portion 23 of the grip member 2, then flows from the four slits in the grip member 2 to the four seating surfaces 18 and the concave grooves 19, thus blowing air on the four seating surfaces 18 and cleaning these seating surfaces 18.

Next, the operation confirmation mechanism 80 will be explained.

Figure 10:
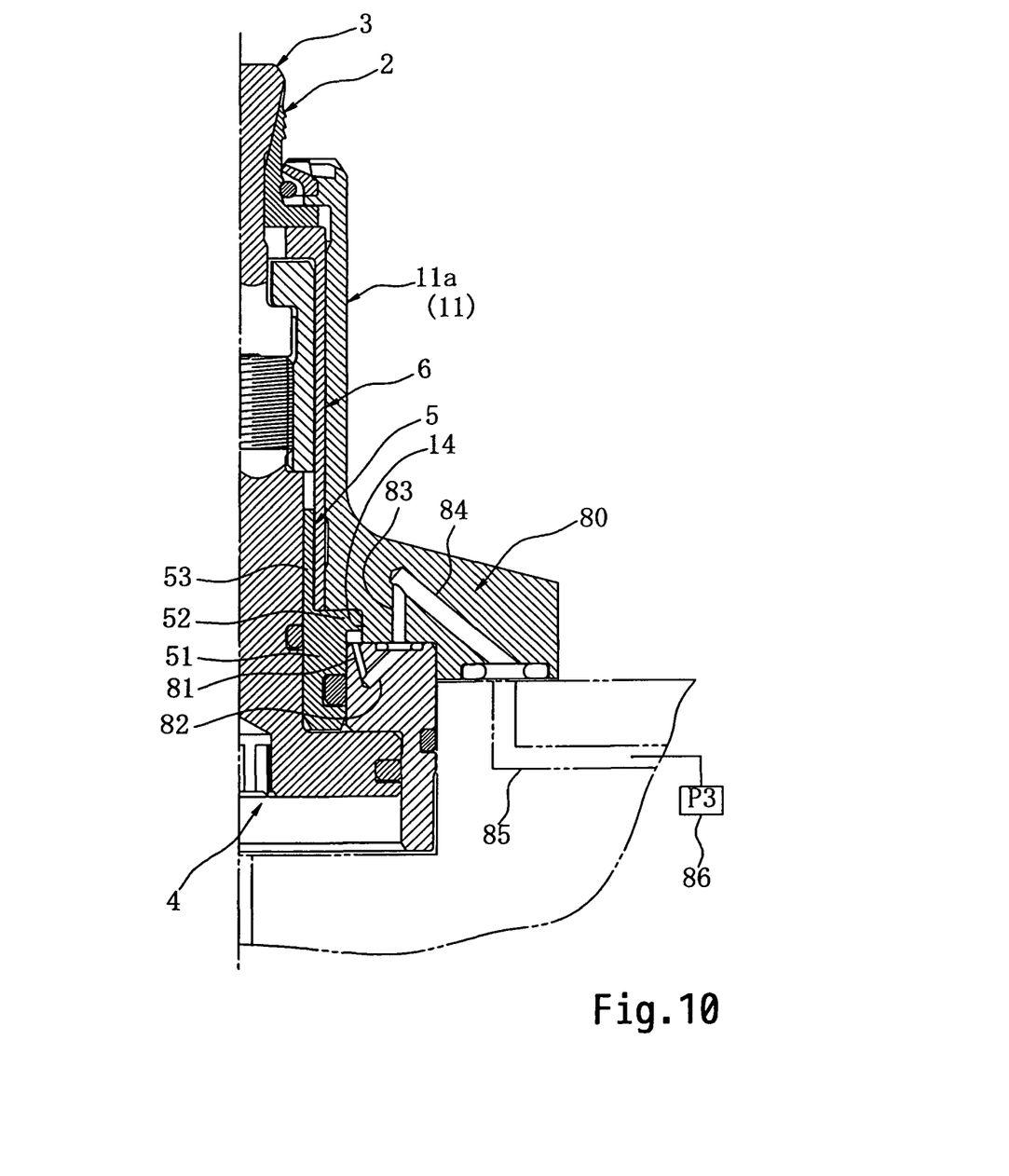
FIG. 10 is a sectional view along lines X-X of FIG. 1.

As shown in FIG. 10, the operation confirmation mechanism 80 is a device for detecting the state in which the annular pressure reception member 5 is at its upper limit position and the state in which it is at its lower limit position. This operation confirmation mechanism 80 has an air ejection hole 81 that opens in the lower end wall 14b of the containment bore 14 to face the engagement flange portion 52, air passages 82 to 85 that supply pressurized air to this air ejection hole 81, and a pressure switch 86 that detects rise and fall of the air pressure in the air passage 85.

The air passage 82 is formed in the lower main body member 12 and is communicated with the air ejection hole 81. And the air passages 83, 84 are formed in the upper main body member 11 and are communicated with the air passage 82. Moreover, the air passage 85 is formed in the base main body member 13 and is communicated with the air passage 84.

Figure 5:
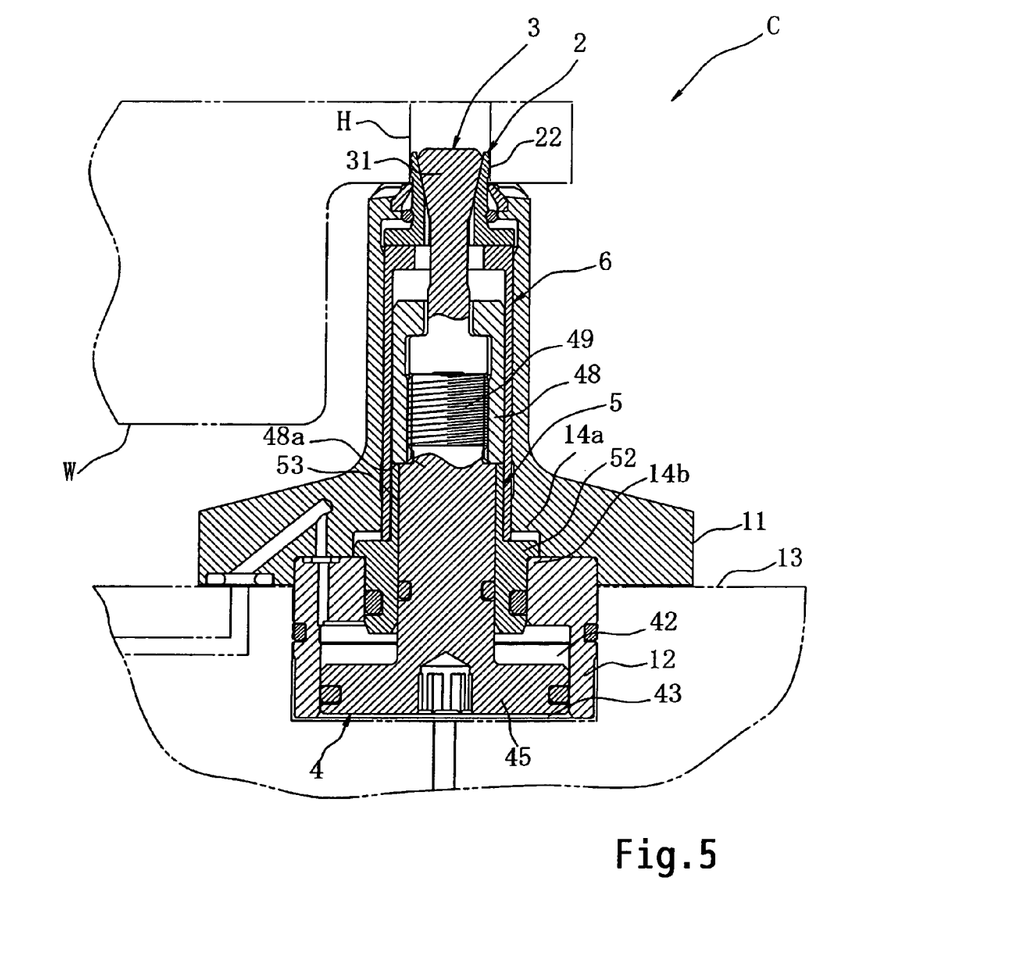
FIG. 5 is a sectional view of the clamp device showing a situation in which an error has occurred in clamping.
Figure 6:
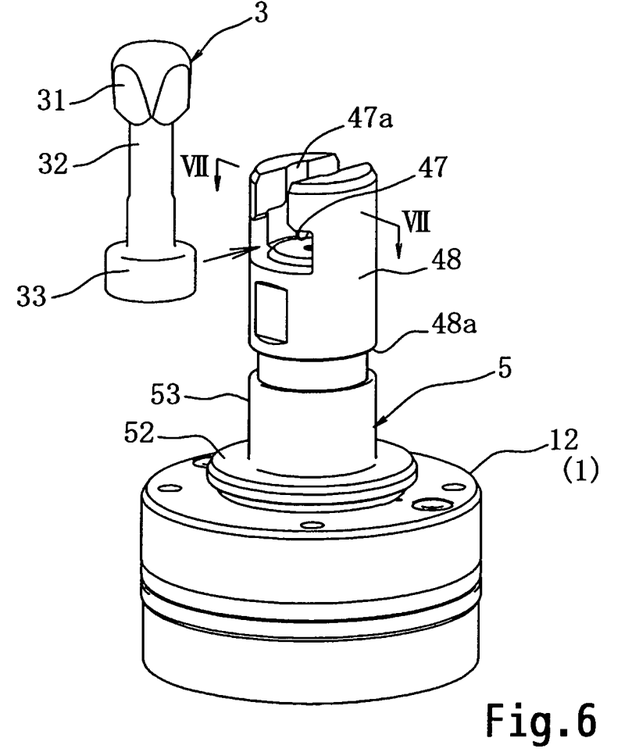
FIG. 6 is an exploded perspective view of a lower main body member, a piston member, and a clamp rod.
Figure 7:
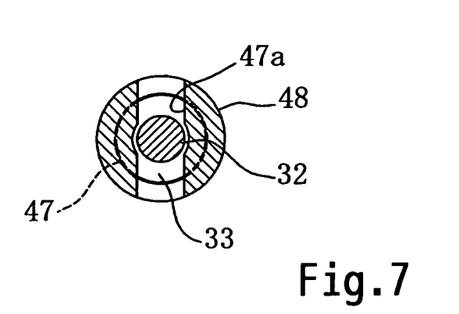
FIG. 7 is a sectional view along lines VII-VII of FIG. 6, in a state in which the clamp rod is linked to the piston member.
Figure 8:
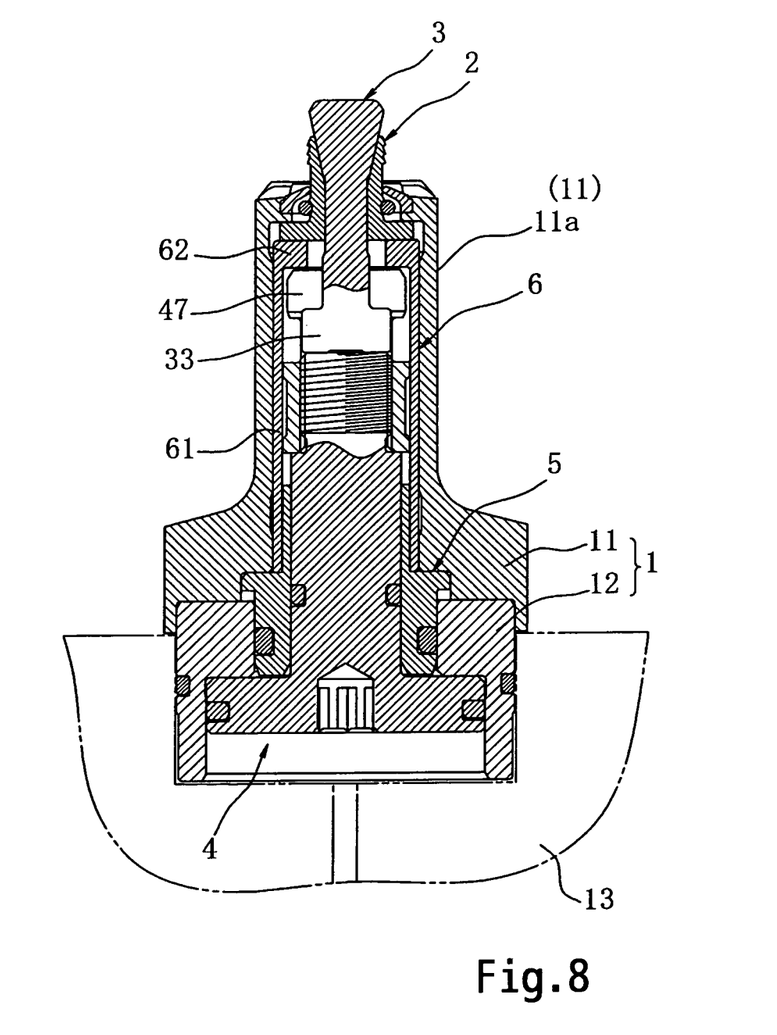
FIG. 8 is a sectional view along lines VIII-VIII of FIG. 1.

When, as shown in FIG. 5, the piston member 41 and the annular pressure reception member 5 are at their lower limit positions, air pressure "high" is detected by the pressure switch 86, because the engagement flange portion 52 contacts against the lower end wall 14b and closes the air ejection hole 81. And when, as shown in FIG. 4, the engagement portion 52 is in its state in which it is contacted against neither the lower end wall 14b nor the upper end wall 14a, air pressure "low" is detected by the pressure switch 86, because the pressurized air that is supplied from the air ejection hole 8 to the containment bore 14 leaks through the outer circumferential gap of the engagement flange portion 52 to above the annular pressure reception member 5. Furthermore when, as shown in FIGS. 2 and 3, the piston member 41 and the annular pressure reception member 5 are at their upper limit positions, air pressure "high" is detected by the pressure switch 86, because the engagement flange portion 52 contacts against the upper end wall 14a and the air passage is intercepted. It should be understood that the hydraulic pressure supply source, the sensors and so on are electrically connected to a control unit (not shown in the figures), and are controlled by the control unit.

The operation of the clamp device C and its technical advantages will now be described. When fixing a workpiece W with the clamp device C, first, initially, hydraulic pressures of almost the same value are supplied to the clamping hydraulic chamber 42 and to the unclamping hydraulic chamber 43. When this is done, since on the piston member 41 the pressure receiving area of the unclamping hydraulic chamber 43 is larger than the pressure receiving area of the clamping hydraulic chamber 42, accordingly the piston member 41 is raised to its upper limit position as shown in FIG. 2, and goes into its stopped state there. Moreover, since the annular pressure reception member 5 receives the hydraulic pressure in the clamping hydraulic chamber 42, accordingly the annular pressure reception member 5 and the support member 6 are held at their upper limit positions, and the grip member 2 and the clamp rod 3 are held at their upper limit positions.

In this state, the workpiece W is loaded, and, as shown in FIG. 2, the grip member 2 and the tapered shaft portion 31 of the clamp rod 3 are inserted into the aperture H of the workpiece W, and the workpiece W is supported on the seating surfaces 18. Next, the hydraulic pressure in the unclamping hydraulic chamber 43 is changed over to a predetermined hydraulic pressure that is lower than the hydraulic pressure in the clamping hydraulic chamber 42, and the predetermined hydraulic pressure is applied on the piston member 41 in the downward direction.

When this is done, the annular pressure reception member 5 that receives the hydraulic pressure in the clamping hydraulic chamber 42 is held at its upper limit position in a similar manner to that described above, and the grip member 2 is also held at its upper limit position, but, since a hydraulic pressure in the downwards direction operates on the piston member 41 and thus the piston member 41 is driven downwards within the range of the gap G1, accordingly the clamp rod 3 is shifted relatively downwards with respect to the grip member 2.

As a result, the grip claw portions 24 of the grip member 2 are driven radially outwards by the tapered shaft portion 31, and are brought into the state of biting into and engaging with the inner peripheral surface of the aperture H in the workpiece W. Next when, for the clamping operation, the hydraulic pressure in the unclamping hydraulic chamber 43 is lowered down to drain pressure, since a large hydraulic pressure is applied on the piston member 41 in the downwards direction and the grip member 2 and the clamp rod 3 cannot shift relatively to one another, accordingly the piston member 42, the grip member 2, the clamp rod 3, and the annular pressure reception member 5 are driven slightly downward all together, and the workpiece W reaches its clamped state in which it is strongly pressed against the seating surfaces 18, and stops there.

Since at this time, as shown in FIG. 4, a gap remains between the engagement flange portion 52 and the lower end wall 14b of the containment bore 14 and also a gap remains between the engagement flange portion 52 and the upper end wall 14a of the containment bore 14, accordingly air pressure "low" is detected by the pressure switch 86 of the operation confirmation mechanism 80, so that it is possible to confirm that the workpiece W has been clamped in a normal manner.

Now if the workpiece W is a casting and the aperture H therein is a tapered aperture whose diameter becomes larger downwards, or if the workpiece W is made from a hard metallic material, then, when the hydraulic pressure in the unclamping hydraulic chamber 43 is reduced to drain pressure and the piston member 41 start to be driven downwards, sometimes it happens that the grip claw portions 22 slip downwards from the inner peripheral surface of the aperture H.

Since in this case, as shown in FIG. 5, the piston member 41 and the annular pressure reception member 5 descend to their lower limit positions, accordingly air pressure "high" is detected by the pressure switch 86 of the operation confirmation mechanism 80, so that it is detected that the workpiece W is not clamped in a normal manner. If the aperture H in the workpiece W is too large and it is not possible to perform clamping with the grip member 2, so that clamping has been performed with the workpiece W in the state of still being raised up from the seating surfaces 18, then the same thing happens, and it is possible to detect with the operation confirmation mechanism 80 that the workpiece W is not clamped in a normal manner.

It should be understood that, if the decision as to whether normal clamping or improper clamping has been performed is made by using the detection signal from the pressure switch 86, then, in some cases, in order to make the decision, this information may be combined with information about the hydraulic pressure in the unclamping hydraulic chamber 43 as detected by the pressure detection sensor 76.

And, in a case in which a workpiece W is clamped by a plurality of clamp devices C, if the positions of the centers of the apertures H in the workpiece W are slightly deviated due to manufacturing errors in the various workpieces W, then, when the clamp rods 3 and the grips member 2 are inserted into the apertures H, or when they are clamped, the axis of a clamp rod 3 and a grip member 2 may deviate from the axis of a hydraulic pressure cylinder 4 due to elastic deformation of a scraper 28. However, when the clamp device C is returned to its unclamped state after cutting process of the workpiece W, the axis of the clamp rod 3 and the grip member 2 automatically returns so as to coincide with the axis of the hydraulic pressure cylinder 4, due to the elastic force of the scraper 28.

If the outer diameter of the tubular main body portion 11a is termed D and the outer diameter of the grip member 2 in its unclamped state is termed d, then it is desirable for D to be set in the range (1.8~3.0)×d. Putting D to be D<1.8 d is difficult from the point of view of manufacturing technique. And, when D>3.0 d, the convenience of use when clamping the workpiece W with the clamp device C deteriorates.

For example, in a case such as one in which a plurality of ribs, spaced apart at small intervals, are provided on and project from the lower surface of a flange portion on the external periphery of the workpiece W, then it is not possible to insert the grip member 2 and the clamp rod 3 into an aperture in the workpiece because it is not possible to insert the tubular main body portion 11 into the spaces between the ribs, so that it is not possible to clamp the workpiece. Or, in a case such as one in which clamping is to be performed on a bolt hole formed on an external peripheral portion of the workpiece, if a seating portion is present on the external peripheral portion of the lower side of the bolt hole, and if the outer diameter D of the tubular main body portion 11a is greater than the outer diameter of the seating portion, then it is not possible to perform clamping on this bolt hole.

In summary, it is desirable for the diameter of the tubular main body portion 11a to be as small as possible, in order, if a convex portion, a concave portion, a stepped portion or the like is present in the vicinity of the aperture in the workpiece that is to be the object of clamping, to avoid interference between the convex portion, concave portion, or stepped portion and the body member 11a.

Since, as described above, the tubular main body portion 11a is formed at the central portion of the upper half portion of the main body member 1, and moreover the length of the tubular main body portion 11a in the vertical direction is formed to be approximately half of the total height of the main body member 1; and furthermore since, as described above, the outer diameter D of the tubular main body portion 11a is set within the range of (1.8~3.0)×d, accordingly it is possible to improve the convenience of use of the clamp device C, and it is possible to enhance the usability of the clamp device C for various diverse applications in a remarkable manner.

Moreover, the axis of the hydraulic pressure cylinder 4 and the axis of the grip member 2 and the clamp rod 3 coincide with one another, therefore the constructions of the various components are not made more complicated and it is possible to economize the cost of production of the clamp device C.

After, in the state in which the workpiece W is supported on the seating surfaces 18, the grip member 2 and the tapered shaft portion 31 have been inserted into the aperture H with the grip member 2 being supported by the annular pressure reception member 5 and the support member 6 that are biased upwards by hydraulic pressure, and after the clamp rod 3 has been driven downwards and the grip member 2 has bitten into the wall surface of the aperture H, then the workpiece W can be clamped by driving the clamp rod 3 further downwards.

And, since the T-shaped engagement portion 33 is formed at the lower end portion of the clamp rod 3, and it is arranged for this T-shaped engagement portion 33 to be capable of engagement from the side with the T-shaped concave engagement portion 47 at the upper end portion of the rod portion 46 in the horizontal direction, accordingly it becomes possible to reduce the diameter of the rod portion 46 of the piston member 41 of the hydraulic pressure cylinder 4, and it becomes possible to reduce the diameter of the tubular main body portion 11a.

Since the upper end portion and the outer circumferential portion of the upper half portion of the rod portion 46 are formed as the separated outer circumferential member 48 that defines the T-shaped concave engagement portion 47, since the threaded shaft portion 49 is formed on the center portion of the upper half portion of the rod portion 46, and since the lower half portion of the separated outer circumferential member 48 is engaged on the threaded shaft portion 49 by being screwed thereonto, accordingly this is advantageous from the point of view of manufacturing the T-shaped concave engagement portion 47, and from the point of view of assembling and engaging the T-shaped engagement portion 33 of the clamp rod 3 to the T-shaped concave engagement portion 47.

Moreover, since the clamping hydraulic chamber 42 that holds hydraulic pressure to act in the vertical direction on the annular pressure reception member 5 is defined between the piston portion 45 of the hydraulic pressure cylinder 4 and the annular pressure reception member 5, accordingly it is possible always to bias the annular pressure reception member 5 and the support member 6 upwards by the hydraulic pressure in the clamping hydraulic chamber 42, so that it is possible to support the grip member 2 with the support member 6.

It is possible to regulate the upper limit position and the lower limit position of the annular pressure reception member 5 by receiving and stopping the annular pressure reception member 5 with the upper wall portion 14a and the lower wall portion 14b of the containment chamber 14. And, since the lower limit position of the clamp rod 3 and the piston member 41 is regulated by receiving and stopping the engagement stop portion 48a at the lower end of the separated outer circumferential member 48 with the thin sleeve 53 of the annular pressure reception member 5 which is at its lower limit position, accordingly it is not necessary to provide any stopper member to the main body member 1 for receiving and stopping the clamp rod 3 and the piston member 41 at their lower limit positions.

Since the support member 6 is made so as to be separate from the annular pressure reception member 5, accordingly it becomes possible to regulate the lower limit position by receiving the engagement stop portion 48a at the lower end of the separated outer circumferential member 48 with the thin sleeve 53 of the annular pressure reception member 5 and thus stopping it.

Even if there is some error in the position of the aperture H in the workpiece W, it is still possible for the grip member 2 to bite properly into the wall surface of the aperture H, since the grip member 2 and the clamp rod 3 are movable in the horizontal direction with respect to the tubular main body portion 11a and the piston member 41.

And, due to the scraper 28, when the clamping device returns to the unclamped state, it is possible to ensure that the axis of the grip member 2 and the clamp rod 3 returns so as to coincide with the axis of the hydraulic pressure cylinder 4.

Since it is possible to detect the states in which the annular pressure reception member 5 is at its upper limit position and the state in which it is at its lower limit position with the operation confirmation mechanism 80, accordingly it is possible to confirm the unclamped state in which the grip member 2 and the annular pressure reception member 5 are at their upper limit positions, and it is also possible to detect the erroneous clamping state in which, during clamping, the grip member 2 has not gripped against the wall surface of the aperture H in the workpiece W, so that the grip member 2 and the annular pressure reception member 5 have shifted downwards to their lower limit positions.

Embodiment 2

Figure 11:
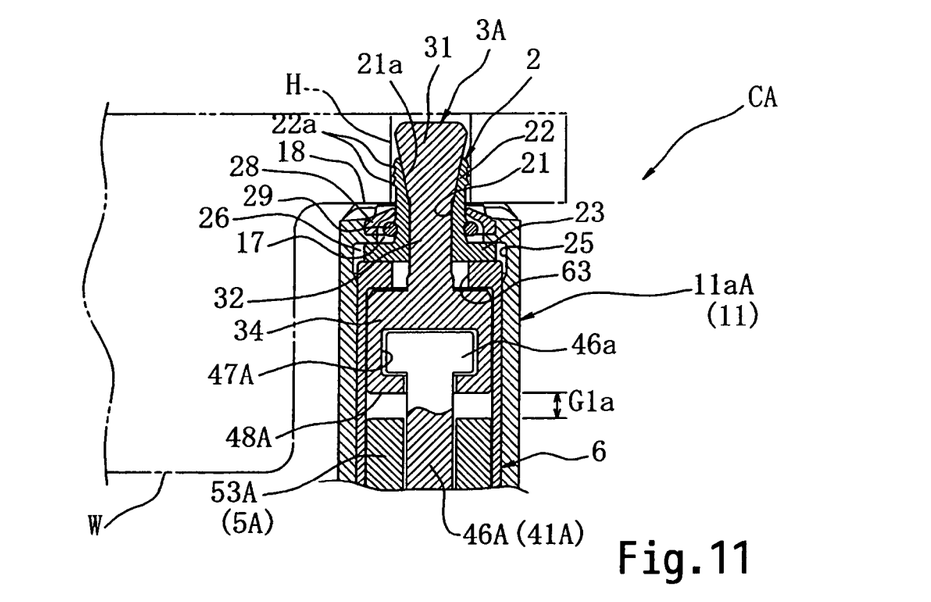
FIG. 11 is a sectional view of the essential portion of a clamp device according to a second embodiment.

With the clamp device CA of a second embodiment, the construction that links together the clamp rod and the piston member is altered: here, similar reference numerals are appended to members that are similar to members of the first embodiment, and only structures that are different from those of the first embodiment will be explained.

As shown in FIG. 11, a grip member 2 and a clamp rod 3A are installed at the upper end portion of a tubular main body portion 11aA. A T-shaped engagement portion 46a is formed at the upper end portion of a rod portion 46A of a piston member 41A, and a T-shaped concave engagement portion 47A to which the T-shaped engagement portion 46a described above can engage from the side in a horizontal direction is formed at the lower end portion of a clamp rod 3A. A support member 6 is fitted over the exteriors of the lower end portion 34 of the clamp rod 3A and a thick sleeve 53A, so as to slide freely thereon.

The rod portion 46A of the piston member is formed to have a diameter smaller than that of the rod portion 46 of the clamp device C of the first embodiment, the inner diameter of the annular pressure reception member 5A is reduced, and the thick sleeve 53A is formed instead of the thin sleeve 53 described above. And an engagement stop portion 48A is formed at the lower end of the clamp rod 3A, and is received and stopped by the upper end of the thick sleeve 53A.

As shown in the figure, when the grip member 2 and the clamp rod 3A are at their upper limit positions, a gap G1a termed the "grip member radial expansion stroke" is formed between the engagement stop portion 48A and the upper end of the thick sleeve 53A. Since the inner diameter of the annular pressure reception member 5A is reduced with this structure, accordingly it is possible to increase the pressure receiving area of the annular pressure reception member 5A, so that it is possible to strengthen the support force for supporting the grip member 2.

Embodiment 3

Figure 12:
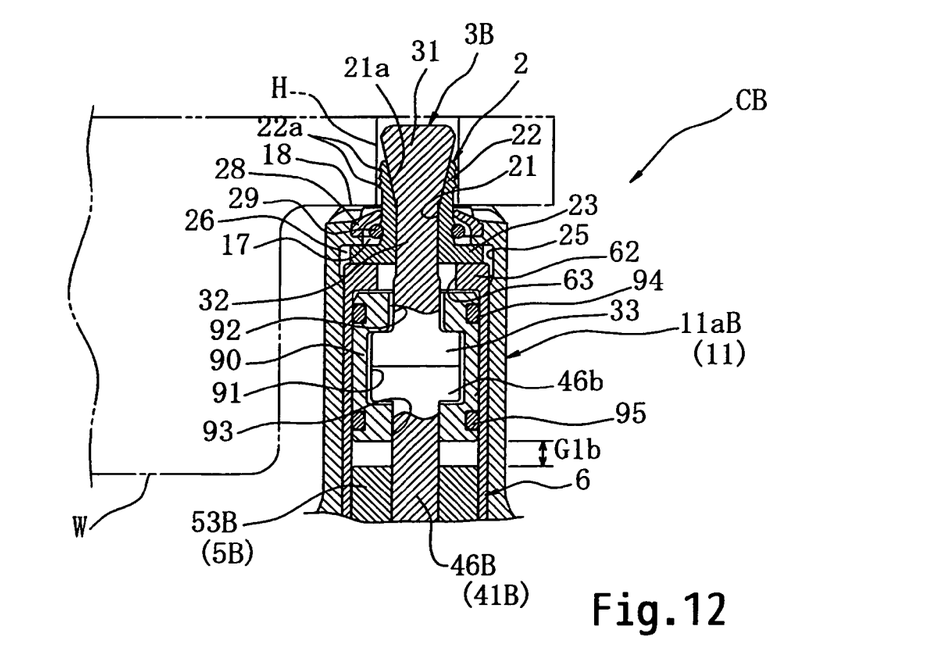
FIG. 12 is a sectional view of the essential portion of a clamp device according to a third embodiment.

With the clamp device CB of a third embodiment, the construction that links together the clamp rod and the piston member is altered here, similar reference numerals are appended to members that are similar to members of the first embodiment, and only structures that are different from those of the clamp device of the first embodiment will be explained.

As shown in FIG. 12, the grip member 2 and a clamp rod 3B are installed at the upper end portion of a tubular main body portion 11aB. The T-shaped engagement portion 33 at the lower end portion of the clamp rod 3B is the same as in the above embodiments. But the rod portion 46B of the piston member 41B is smaller in diameter than the rod portion 46 of the clamp device C of the first embodiment, and, similarly the inner diameter of the annular pressure reception member GB is reduced, and a thick sleeve 53B is formed instead of the thin sleeve 53 of the first embodiment. A T-shaped engagement portion 46b is formed at the upper end portion of the rod portion 46B in an attitude oppositely oriented to that of the T-shaped engagement portion 33, and is contacted against the lower surface of the T-shaped engagement portion 33.

A link member 90 that links together these T-shaped engagement portions 33, 46b is cylindrical in external shape and has a containment aperture 91 in its central internal stepped portion containing two T-shaped engagement portions 33, 46b, with circular holes 92, 93 being formed above and below this containment aperture 91, both of these circular holes having smaller diameters than the containment aperture 91. The link member 90 is divided along a vertical plane that contains its central axis and thus consists of a pair of separate parts, with these separate parts being closed together around the two T-shaped engagement portions 33, 46b and being coupled together by a pair of ring members 94, 95. The upper side ring member 94 is installed in a ring groove near the upper end of the link member 90, while the lower side ring member 95 is installed in a ring groove near its lower end. The support member 6 is fitted over the exteriors of this link member 90 and the thick sleeve 53B so as to be able to slide freely.

When, as shown in the figure, the grip member 2 and the clamp rod 3B are at their upper limit positions, a gap G1b termed the "grip member radial expansion stroke" is formed between the link member 90 and the upper end of the thick sleeve 53B.

Since the inner diameter of the annular pressure reception member 5B is reduced with this structure, accordingly it is possible to simplify the structure for linking together the clamp rod 3B and the rod portion 46B of the piston member 41B, while still being able to increase the pressure receiving area of the annular pressure reception member 5B and thus to strengthen the support force for supporting the grip member 2.

Next, examples will be explained in which the above embodiments are partially altered.

1) The numerical values shown for the gaps G1 and G2 and for various other dimensions are only given by way of example; these numerical values should not be considered as being limitative.

2) The shape of the upper main body portion 11 as seen in plan view in the figure is not to be considered as being limitative; it could also be formed as circular. Moreover, while this clamp device utilizes the hydraulic pressure cylinder 4, it would also be possible to arrange to employ an air cylinder instead of a hydraulic cylinder.

3) Furthermore, provided that no departure is made from the gist of the present invention, it would also be possible to implement the present invention as embodiments to which various other changes have been made.

INDUSTRIAL APPLICABILITY

There are various possibilities for utilization in industry since, when a cutting process is to be performed on the upper surface of a workpiece that is to be subjected to machine processing, it is possible to perform clamping of the workpiece by taking advantage of the aperture.

The invention claimed is:

1. A clamp device comprising:
an annular grip member capable of being inserted into an aperture in a workpiece and gripping an inner peripheral surface of the aperture;
a clamp rod having a tapered shaft portion fitted into and engaged with the grip member;
a fluid pressure cylinder for driving the grip member and the clamp rod forwards and backwards in an axial direction; and
a main body member to which the grip member, the clamp rod, and the fluid pressure cylinder are mounted; and
wherein a first portion of an upper half of the main body member has a cylindrical outer wall extending along an upper length of said upper half, said cylindrical outer wall of said first portion having a constant outer diameter along said upper length, said outer diameter being less than an outer diameter of a vertical cylinder bore of the fluid pressure cylinder; and
wherein in the unclamped state, an upper half portion of the grip member and the tapered shaft portions of the clamp rod project outwards from an upper end of the first portion, and lower half portion of the grip member and a lower portion of the clamp rod which is extending below from the tapered shaft portion are fitted in the first portion.

2. A clamp device comprising:
an annular grip member capable of being inserted into an aperture in a workpiece and gripping an inner peripheral surface of the aperture;
a clamp rod having a tapered shaft portion fitted into and engaged with the grip member;
a fluid pressure cylinder for driving the grip member and the clamp rod forwards and backward in an axial direction; and
a main body member to which the grip member, the clamp rod, and the fluid pressure cylinder are mounted;
a seating surface for seating a workpiece, formed at an upper end of the tubular main body portion;
a piston portion and a rod portion extending from the piston portion upwards into the tubular main body portion, the piston portion and the rod portion being constituted with a piston member of the fluid pressure cylinder;
an annular pressure reception member fitted over the rod portion and biased upwards by fluid pressure; and
a support member movably fitted on an exterior of the rod portion and capable of moving integrally with the annular pressure reception member, and which supports the grip member from beneath; and
wherein a tubular main body portion, which projects upwards and has an outer diameter less than an inner diameter of a vertical cylinder bore of the fluid pressure cylinder, is provided at a center portion of an upper half portion of the main body member; and
wherein the unclamped state, an upper half portion of the grip member and the tapered shaft portions of the clamp rod project outwards from an upper end of the tubular main body portion, and a lower half portion of the grip member and a lower portion of the clamp rod which is extending below from the tapered shaft portion are fitted in the tubular main body portion.

3. A clamp device comprising:
an annular grip member capable of being inserted into an aperture in a workpiece and gripping an inner peripheral surface of the aperture;
a clamp rod having a tapered shaft portion fitted into and engaged with the grip member;
a fluid pressure cylinder for driving the grip member and the clamp rod forwards and backwards in an axial direction; and
a main body member to which the grip member, the clamp rod, and the fluid pressure cylinder are mounted; and
wherein a tubular main body portion, which projects upwards and has an outer diameter less than an inner diameter of a vertical cylinder bore of the fluid pressure cylinder, is provided at a center portion of an upper half portion of the main body member; and
wherein in the unclamped state, an upper half portion of the grip member and the tapered shaft portions of the clamp rod project outwards from an upper end of the tubular main body portion;
wherein a seating surface for seating a workpiece is formed at the upper end of the tubular main body portion;
wherein a piston portion and a rod portion extend from the piston portion upwards into the tubular main body portion, the piston portion and the rod portion being constituted with a piston member of the fluid pressure cylinder;
wherein an annular pressure reception member is fitted over the rod portion and is biased upwards by fluid pressure;
wherein a support member is movably fitted on an exterior of the rod portion, is capable of moving integrally with the annular pressure reception member, and supports the grip member from beneath;
wherein a T-shaped engagement portion is formed at a lower end portion of the clamp rod; and wherein a concave T-shaped engagement portion is formed at an upper end portion of the rod portion, to which the T-shaped engagement portion can engage from a horizontal side direction.

4. A clamp device according to claim 3, wherein the upper end portion of the rod portion and an outer circumferential portion of an upper half portion of the rod portion are formed as a separated outer circumferential member that constitutes the T-shaped concave engagement portion; a threaded shaft portion is formed on an upper half portion of the rod portion; and the separated outer circumferential member is screwed to the threaded shaft portion.

5. A clamp device according to claim 4, wherein a fluid operation chamber for clamping that applies fluid pressure on the annular pressure reception member in an upward direction is formed between the piston portion of the fluid pressure cylinder and the annular pressure reception member.

6. A clamp device according to claim 5, wherein an engagement flange portion formed at an upper end portion of the annular pressure reception member is contained in a containment bore of the main body member slidably upwards and downwards; a lower limit position of the annular pressure reception member is regulated by receiving the engagement flange portion with a lower end wall of the containment bore; and an upper limit position of the annular pressure reception member is regulated by receiving the engagement flange portion with an upper end wall of the containment bore.

7. A clamp device according to claim 6, wherein the clamp device is adapted so that a lower limit position of the clamp rod is regulated by a lower end portion of the separated outer circumferential member being stopped by the annular pressure reception member which is at its lower limit position.

8. A clamp device according to claim 7, wherein the support member is made separate from the annular pressure reception member, and a lower end of the support member is contacted against an upper end of the upper end portion of the annular pressure reception member.

9. A clamp device according to claim 1, wherein the grip member and the clamp rod are formed to be movable along a direction orthogonal to the axis.

10. A clamp device according to claim 9, wherein an elastic biasing means is provided that elastically biases the grip member and the clamp rod so that an axis of the grip member and the clamp rod coincides with an axis of the fluid pressure cylinder.

11. A clamp device according to claim 6, wherein an operation confirmation means is provided, having an air ejection hole that opens in the lower end wall of the containment bore so as to face the engagement flange portion, an air passage for supplying pressurized air to the air ejection hole, and an air pressure detection means for detecting the presence or absence of air pressure within the air passage; and by being adapted so as to detect, with the operation confirmation means, a state in which the annular pressure reception member is at its upper limit position and a state in which it is at its lower limit position.

12. A clamp device according to claim 3, wherein in the undamped state a lower half portion of the grip member and a lower portion of the clamp rod which is extending below from the tapered shaft portion are fitted in the tubular main body portion.

13. A clamp device according to claim 12, wherein the upper end portion of the rod portion and an outer circumferential portion of an upper half portion of the rod portion are formed as a separated outer circumferential member that constitutes the T-shaped concave engagement portion; a threaded shaft portion is formed on an upper half portion of the rod portion; and the separated outer circumferential member is screwed to the threaded shaft portion.

14. A clamp device according to claim 13, wherein a fluid operation chamber for clamping that applies fluid pressure on the annular pressure reception member in an upward direction is formed between the piston portion of the fluid pressure cylinder and the annular pressure reception member.

15. A clamp device according to claim 14, wherein an engagement flange portion formed at an upper end portion of the annular pressure reception member is contained in a containment bore of the main body member slidably upwards and downwards; a lower limit position of the annular pressure reception member is regulated by receiving the engagement flange portion with a lower end wall of the containment bore; and an upper limit position of the annular pressure reception member is regulated by receiving the engagement flange portion with an upper end wall of the containment bore.

16. A clamp device according to claim 15, wherein the clamp device is adapted so that a lower limit position of the clamp rod is regulated by a lower end portion of the separated outer circumferential member being stopped by the annular pressure reception member which is at its lower limit position.

17. A clamp device according to claim 16, wherein the support member is made separate from the annular pressure reception member, and a lower end of the support member is contacted against an upper end of the upper end portion of the annular pressure reception member.

18. A clamp device according to claim 15, wherein an operation confirmation means is provided, having an air ejection hole that opens in the lower end wall of the containment bore so as to face the engagement flange portion, an air passage for supplying pressurized air to the air ejection hole, and an air pressure detection means for detecting the presence or absence of air pressure within the air passage; and by being adapted so as to detect, with the operation confirmation means, a state in which the annular pressure reception member is at its upper limit position and a state in which it is at its lower limit position.

19. A clamp device according to claim 1, further comprising:

a seating surface for seating a workpiece, formed at the upper end of said first portion;

a piston portion and a rod portion extending from the piston portion upwards into the first portion, the piston portion and the rod portion being constituted with a piston member of the fluid pressure cylinder;

an annular pressure reception member fitted over the rod portion and biased upwards by fluid pressure; and a support member movably fitted on an exterior of the rod portion and capable of moving integrally with the annular pressure reception member, and which supports the grip member from beneath.

* * * * *